(12) United States Patent
Leng

(10) Patent No.: US 8,846,176 B2
(45) Date of Patent: Sep. 30, 2014

(54) HONEYCOMB COMPOSITE PLATE OF PLASTIC FOAM

(76) Inventor: Luhao Leng, Fujian (CN)

( * ) Notice: Subject to any disclaimer, the term of this patent is extended or adjusted under 35 U.S.C. 154(b) by 626 days.

(21) Appl. No.: 12/682,627

(22) PCT Filed: Dec. 29, 2008

(86) PCT No.: PCT/CN2008/073809
§ 371 (c)(1),
(2), (4) Date: Apr. 12, 2010

(87) PCT Pub. No.: WO2009/089757
PCT Pub. Date: Jul. 23, 2009

(65) Prior Publication Data
US 2010/0221487 A1    Sep. 2, 2010

(30) Foreign Application Priority Data
Dec. 29, 2007  (CN) .......................... 2007 1 0144145

(51) Int. Cl.
*B32B 3/12*     (2006.01)
*B32B 5/18*     (2006.01)
*B32B 27/06*    (2006.01)

(52) U.S. Cl.
CPC ... *B32B 3/12* (2013.01); *B32B 5/18* (2013.01); *B32B 27/06* (2013.01)

USPC .......... 428/116; 428/117; 428/118; 428/73; 428/72

(58) Field of Classification Search
None
See application file for complete search history.

(56) References Cited

U.S. PATENT DOCUMENTS

| 4,265,955 | A  | * | 5/1981  | Harp et al. ............... 428/116 |
| 5,643,652 | A  | * | 7/1997  | Maurer et al. ............ 428/116 |
| 2004/0020162 | A1 | * | 2/2004 | Baratuci et al. ........... 52/786.13 |
| 2005/0019524 | A1 | * | 1/2005 | Kershaw .................. 428/116 |
| 2009/0324872 | A1 | * | 12/2009 | Leng ....................... 428/73 |

FOREIGN PATENT DOCUMENTS

| CN | 2570025 Y   |   | 9/2003 |
| CN | 1657275 A   |   | 8/2005 |
| JP | 2006130734 A |   | 5/2006 |
| WO | WO2005032304 | * | 4/2005 |

* cited by examiner

*Primary Examiner* — Mark Ruthkosky
*Assistant Examiner* — Daniel J Schleis
(74) *Attorney, Agent, or Firm* — Rabin & Berdo, P.C.

(57) ABSTRACT

A honeycomb composite plate of plastic foam comprises at least a support body and a plastic surface sheet. The support body comprises at least a support core, which has a honeycomb structure and is formed of plastic foam. The plastic surface sheet is fixed to the support body and supported by it. Further, the support core and the plastic surface sheet are fixed together.

11 Claims, 9 Drawing Sheets

HONEYCOMB COMPOSITE PLATE OF PLASTIC FOAM

FIELD OF INVENTION

The present invention relates generally to a composite plate, more particularly, to a composite plate comprising a plastic foam honeycomb core.

BACKGROUND

The applicant of the present application filed a Chinese utility model patent application ("A Composite Plate", publication No. CN2570025Y) on Aug. 16, 2002, published on Sep. 3, 2003. The composite plate described in that application comprises a surface sheet, a bottom plate, a honeycomb paper and plastic foam fillings. The surface sheet and the bottom plate are plastic plates directly formed by injection moulding or hot pressing. The honeycomb paper is sandwiched between the surface sheet and the bottom plate, the edge of the surface sheet is sealed and fastened to its corresponding edge of the bottom plate by ultrasonic welding or gluing. The plastic foam fillings are filled in the space between the honeycomb paper and the surface sheet, and the space between the honeycomb paper and the bottom plate where they are not in contact. Since the surface sheet and the bottom plate are made in the form of the final products, the honeycomb paper is used as a frame, and the plastic foam is used as filling and adhesive, various shapes of the composite plate can be flexibly designed according to the requirements of the final products, without additional machining. This structure of the composite plate also conveniently allows embedding of connection plates or pipes, thereby increasing the structural strength of the composite plate and the connection strength between the composite plate and other components. Advantageously, the plate is light, strong, easy to clean, and inexpensive to manufacture. However, needs for improvement still exist: firstly, the material of the honeycomb paper differs from the surface sheet and bottom plate, resulting in a weak bonding therebetween and ease of disintegration; secondly, the structural strength of the honeycomb paper is weak, resulting in a need for plastic foam filling, increased material use and higher cost; and thirdly, processing of the honeycomb paper is difficult and time consuming and limited to regular flat-surface sheet.

SUMMARY OF THE INVENTION

The present invention provides a honeycomb composite plate of plastic foam, to overcome the shortages of the honeycomb composite plate of the background technology.

In order to solve the technical problems, the present invention focuses on the improvement of the support core of the composite plate, the support core being the honeycomb structure formed by plastic foam material. The applied technical solution is:

A composite plate comprises a plastic foam support core having a honeycomb structure with honeycomb cells. The plastic foam support core comprises a support plate and walls extending from the support plate defining the honeycomb cells. The support plate and the walls of the honeycomb cells form a unitary structure. The composite plate further comprises a plastic surface sheet covering an upper side of the plastic foam support core. The plastic surface sheet is fastened to the plastic foam support core. The composite plate further comprises a plastic base sheet supporting a lower side of the plastic foam support core, The plastic surface sheet extends downwards at an edge of the plastic foam support core. The plastic base sheet extends upwards at the edge of the plastic foam support core. The plastic surface sheet and the plastic base sheet overlap to form an edge of the composite plate.

In a preferred embodiment the composite plate further comprises a support frame.

In a preferred embodiment the support frame surrounds all or part of a periphery of the support core.

In a preferred embodiment the plastic surface sheet is a vacuum mold surface sheet, and the plastic substrate is a vacuum mold substrate.

In a preferred embodiment the plastic surface sheet and the plastic base sheet are welded or glued to the plastic foam support core.

In a preferred embodiment the honeycomb cells have upward or downward openings.

In a preferred embodiment the honeycomb cells of the support core are blind slots and the support plate is an upper plate.

In a preferred embodiment the honeycomb cells of the support core are blind slots, and the support plate is a lower plate.

In a preferred embodiment the honeycomb cells of the support core are double-faced slots, and the support plate is a middle plate.

In a preferred embodiment the plastic base sheet is wave-shaped, and extends into the blind slots of the honeycomb cells of the support core, and welded or glued to a top of the blind slots.

In a preferred embodiment the plastic foam support core has a curved shape.

In a preferred embodiment the honeycomb structure of the support core is made by a single mould pressing and foaming. Compared with the prior art technology, the present invention provides: a support core with a honeycomb structure, the honeycomb structure is made using plastic foam material, and overcomes the drawbacks of the prior art technology. The present invention provides the following advantages: firstly, the honeycomb structure made by the plastic foam material has a lower cost, and higher bearing strength, thus eliminating the need for plastic foam filling; secondly, material of the support core, the plastic surface sheet and plastic base sheet are made from the same material, providing a strong bonding or weld between them. Use of the same material with the same expansion coefficient prevents abscission due to thermal expansion and contraction; and thirdly, the honeycomb structure made by the plastic foam material can be formed in one single step to produce regular or irregular shaped support core. As the openings of the honeycomb cells face upwards or downwards, the composite plate has higher bearing strength and can support weight transferred from the plastic surface sheet very well. Because the honeycomb core has cells which are blind slots or through slots, it can be made by mould foam pressing to form required shape by one single step.

BRIEF DESCRIPTION OF THE DRAWINGS

Further descriptions are provided with the following drawings and embodiments.

DETAILED DESCRIPTION OF THE PREFERRED EMBODIMENT

Embodiment 1

Figure 1:
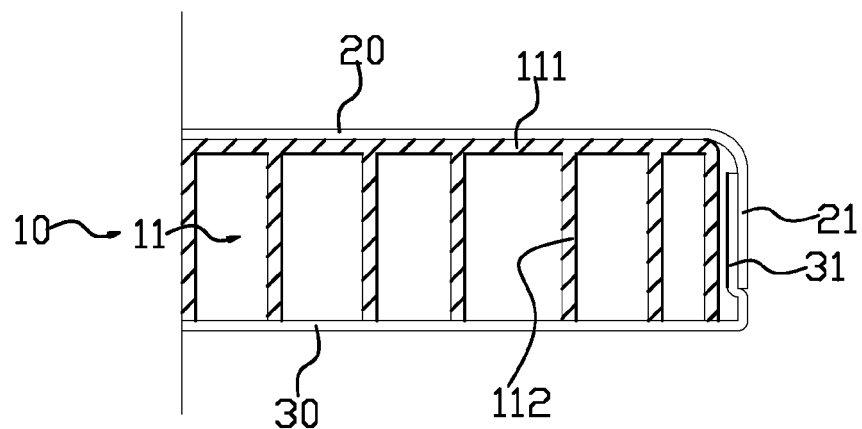
FIG. 1 is a sectional view of the composite plate of the Embodiment 1.

Referring to FIG. 1, a plastic foam honeycomb composite plate comprises a support body 10, a plastic surface sheet 20 and a plastic base sheet 30.

Figure 2:
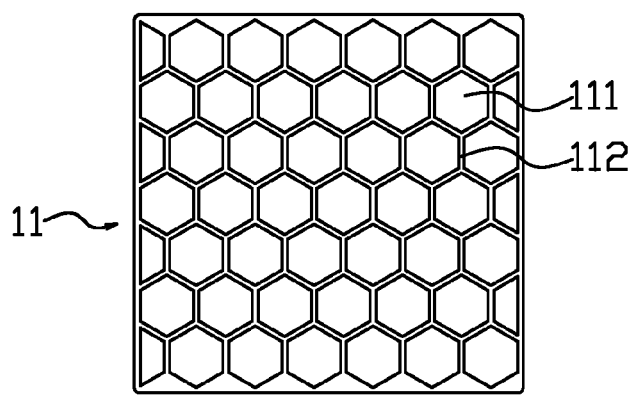
FIG. 2 is a bottom view of the support core of the Embodiment 1.
Figure 3:
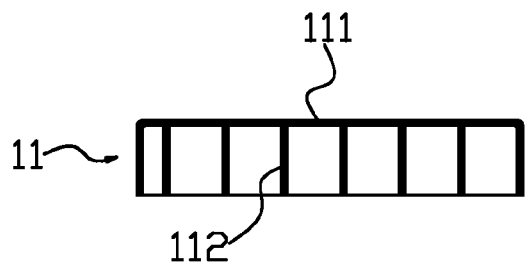
FIG. 3 is a sectional view of the support core of the Embodiment 1.
Figure 4:
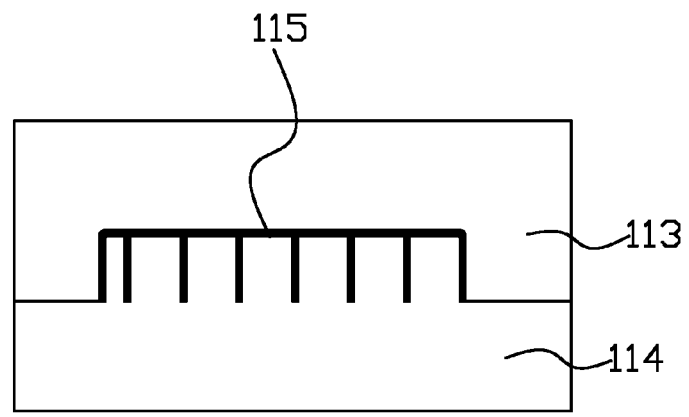
FIG. 4 is a sectional view of the production mould of the support core of the Embodiment 1.

The support body 10 comprises a support core 11, the support core 11 is a honeycomb structure made by a plastic foam material, and the support core 11 in the embodiment has a flat-plate shape. Referring to FIGS. 2 and 3, the honeycomb structure is a bionics product made according to the structural feature of a beehive. In the embodiment, the honeycomb structure comprises an upper plate 111, the walls 112 of hexagonal cells extend from the bottom of the upper plate 111 to form a structure. The adjacent walls 112 of the hexagonal cells are shared. In the honeycomb structure, the walls 112 of the hexagonal cells extend from the upper plate 111 to form the honeycomb cells, the honeycomb cells are blind slots and open downwards. Together with the upper plate, the honeycomb structure can be made in a single step by mould pressing and foaming to form the desired shape without additional machining. Referring to FIG. 4, the production mould used in mould pressing and foaming has an upper mould 113 and a lower mould 114. Combining the upper mould 113 and the lower mould 114 results in a mould cavity 115 providing the honeycomb structure. The honeycomb paper plate of the existing technology cannot provide a unitary structure through a single step process, thus the present invention is advantageous over the existing technology.

The plastic surface sheet 20 and the plastic base sheet 30 have similar structure, both being a single layer plastic sheet with a thickness between 0.3 mm-4 mm. The single layer plastic sheet using ABS, PP or PS is produced using vacuum molding, or processed directly to desired shapes. The single layer plastic sheet is then cut to a desired size as a surface sheet, for example, square, rectangular, circular, other regular or irregular shapes. In the embodiment, the vacuum formed surface sheet 20 and the vacuum formed base sheet 30 are all rectangular. Both sheets have wood grains, other grains, or composite layer with wood grains and other grains printed thereon. In the embodiment, the vacuum formed surface sheet 20, the vacuum formed base sheet 30 are exemplary single layer plastic, but multilayer plastics plate can also be used in the present invention.

The edge of the plastic surface sheet 20 extends downwards to form upper outside periphery 21. The edge of the plastic base sheet 30 extends upwards to form lower outside periphery 31, the lower outside periphery 31 has an inward step whose depth is the same as the thickness of the upper outside periphery 21.

The underside of the plastic surface sheet 20 is connected to the top of the support core 11 by ultrasonic welding or gluing, forming a sealed fixed connection. The plastic base sheet 30 is fastened to the support core 11 through ultrasonic welding or gluing, forming a sealed fixed connection. The interior surface of the upper outside periphery 21 is sealed and fastened to the exterior surface steps above the step in the lower outside periphery 31 by ultrasonic welding or gluing, more specifically, the lower edge of the upper outside periphery 21 connects with the step in the lower outside periphery 31. The plastic surface sheet 20, the plastic base sheet 30 and the support core 11 are fastened together by ultrasonic welding or gluing.

Embodiment 2

Figure 5:
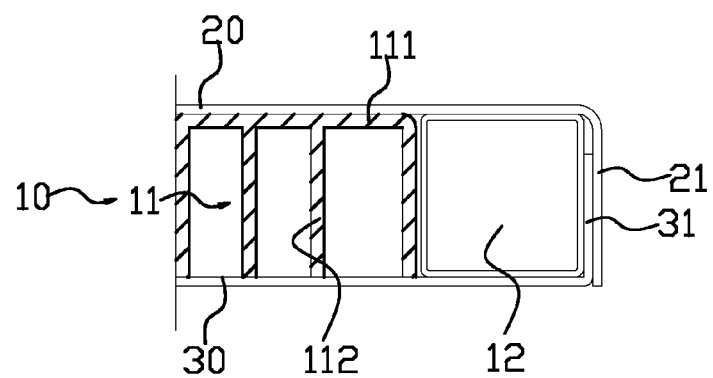
FIG. 5 is a sectional view of the composite plate of the Embodiment 2.

Referring to FIG. 5, the difference between Embodiment 1 and Embodiment 2 is that the support body 10 comprises a support frame 12, the support frame 12 is used to enhance bearing strength and to connect to other components. The whole support frame 12 is a closed-loop frame, for example but not limited to "☐" shaped frame or "O" shaped frame. Other shaped frame can be used in the present invention as well. For example: four pipes may be arranged to form a "☐" shaped frame; a "I" shaped frame; a "||" shaped frame; an "U" shaped frame; or two pipes arranged to stand side by side; or four solid pieces arranged in four corners of the rectangle. The sectional view of the support frame 12 in the Embodiment is a hollow pipe. However, other non-limiting examples include extrusion material, or a combination of pipe, extrusion material and hardware and injection molding components can all be used in the present invention.

The support frame 12 surrounds the support core 11. Specifically, the inner surface of the support frame 12 and the outer surface of the support core 11 are fastened by ultrasonic welding or gluing. By ultrasonic welding or gluing, the plastic surface sheet 20, the top of support core 11 and the support frame 12 form a sealed and fixed connection. The top of the plastic base sheet 30, the bottom of the support core 11 and the bottom of the support frame 12 are sealed and fastened together by ultrasonic welding or gluing. The inner surface of the upper outside periphery 21, the outer surface of the step in the lower outside periphery 31 are sealed and fastened together by ultrasonic welding or gluing. The lower outside periphery 31 is sealed and fastened to the outer surface of the support frame 12 by ultrasonic welding or gluing. The plastic surface sheet 20, the plastic base sheet 30, the support core 11 and the support frame 12 are sealed and fastened together by ultrasonic welding or gluing.

In order to enhance the bearing strength of the composite plate, corner lining components can be set up as needed. It can be welded or glued directly to the support frame 12, or be fastened between the plastic base sheet and the support core.

Embodiment 3

Figure 6:
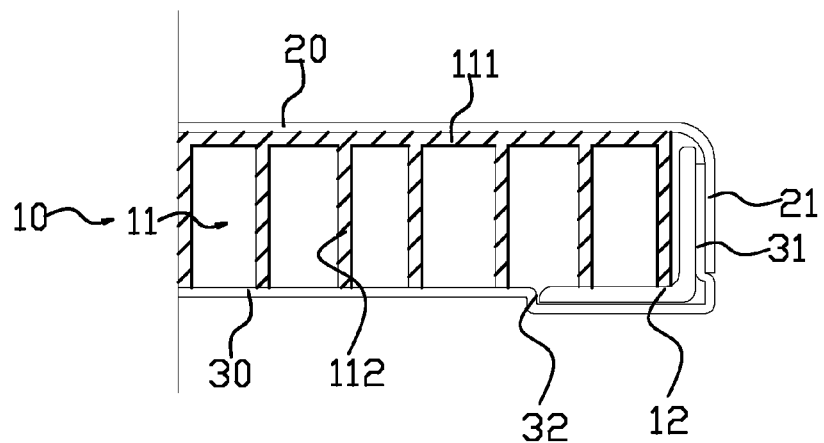
FIG. 6 is a sectional view of the composite plate of the Embodiment 3.

Referring to FIG. 6, the difference between Embodiment 2 and Embodiment 3 is the sectional view of the support frame 12 is an "L" shaped frame, the support frame 12 comprises a horizontal edge and a vertical edge connecting with the outer surface of the horizontal edge, a groove 32 is set at the outside periphery of the plastic base sheet 30. The horizontal edge is welded or glued to the lateral surface of groove 32. The inner surface of the vertical edge is welded or glued to the outer surface of the support core 11. The lower outside periphery is welded or glued to the outer surface of the vertical surface.

Embodiment 4

Figure 7:
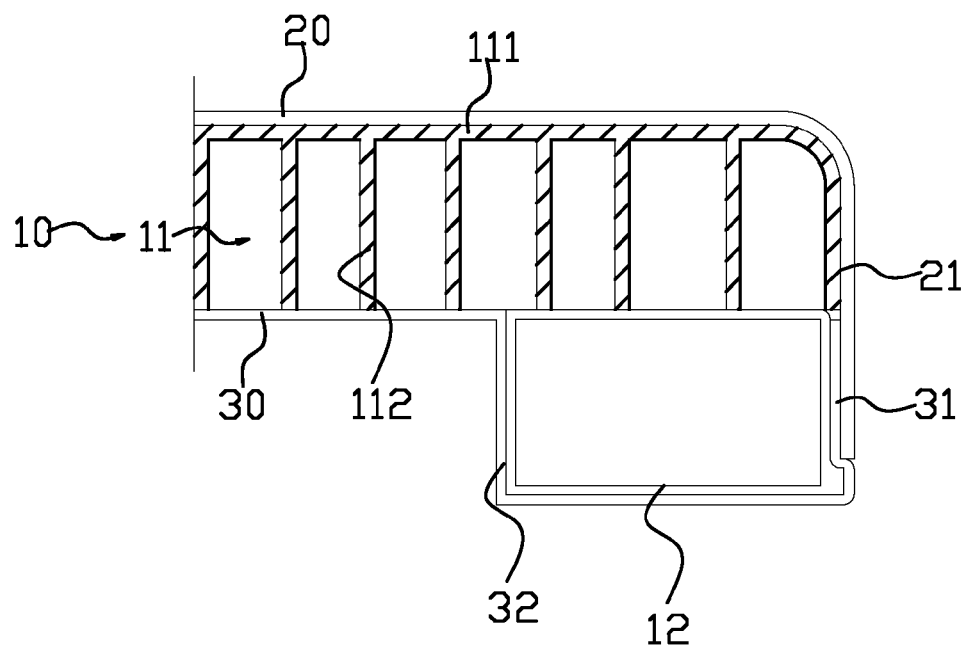
FIG. 7 is a sectional view of the composite plate of the Embodiment 4.

Referring to FIG. 7, the difference between Embodiment 4 and Embodiment 2 is that a placement slot 32 is set along the periphery of the plastic base sheet 30. The support frame 12 is fastened in the placement slot 32. The top of the support frame 12 and the bottom of the support core 11 are in contact, and glued or welded together. The upper outside periphery 21 is welded or glued to the outer side of the support core 11 and the outer side of the lower outside periphery 31.

Embodiment 5

Figure 8:
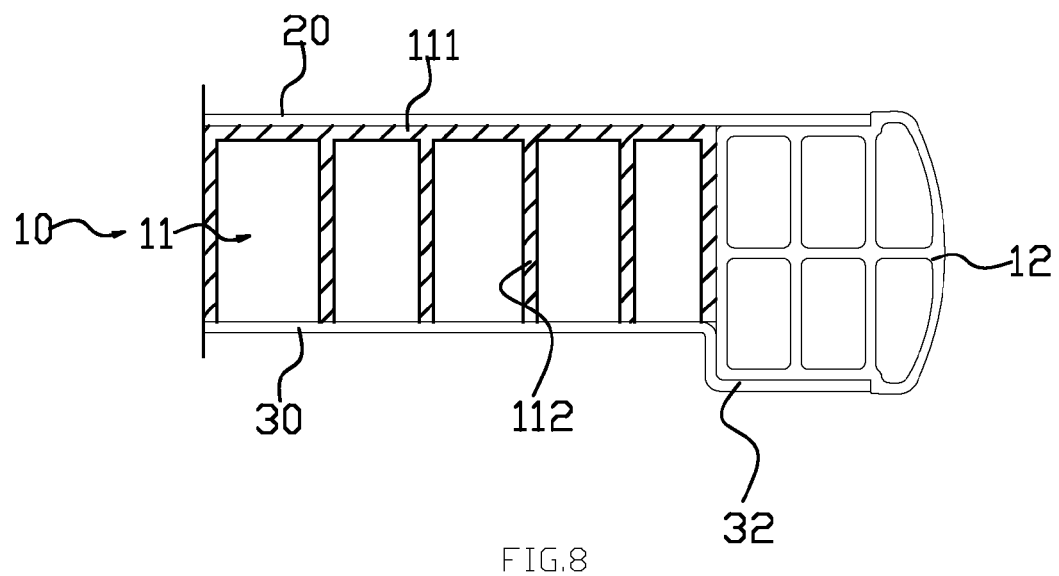
FIG. 8 is a sectional view of the composite plate of the Embodiment 5.

Referring to FIG. 8, the difference between Embodiment 5 and Embodiment 2 is that the support frame 12 has a rim on both the upper side and the lower side The plastic surface sheet 20 is welded or glued to the top of the support frame 12. The plastic surface sheet 20 extends downwards to wrap the outer surface of the support frame 12. The periphery of the plastic base sheet 30 extends downwards and forms a slot 33. The plastic base sheet 30 is welded or glued to the bottom of the support frame 12 and joins the downward extension of the plastic surface sheet 20. The outer side of the support frame 12 forms the periphery of the composite plate.

Embodiment 6

Figure 9:
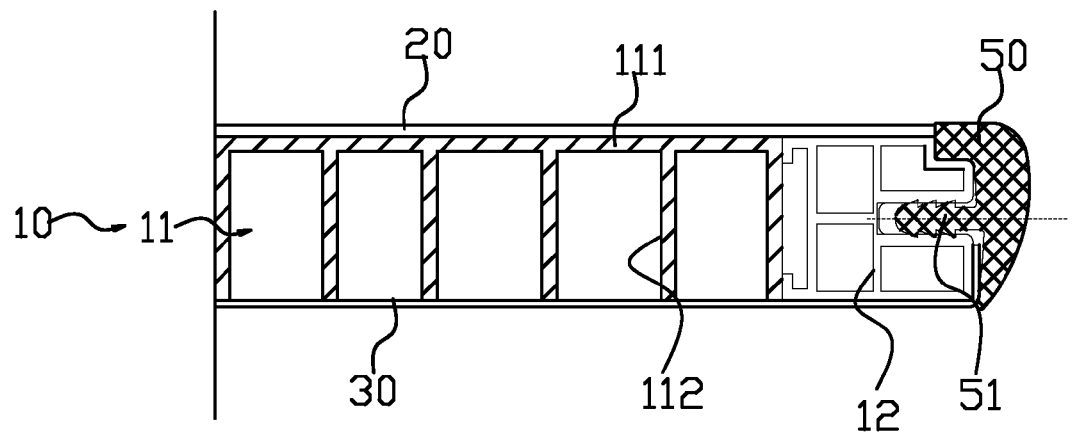
FIG. 9 is a sectional view of the composite plate of the Embodiment 6.

Referring to FIG. 9, the difference between Embodiment 6 and Embodiment 2 is that Embodiment 6 further comprises an edge sealing component 50, a linking slot is provided in the support frame 12, an insertion unit 51 is set on the edge of the sealing component 50, and the insertion unit 51 is connected firmly with the linking slot. The engagement can be, as appropriate, a close fit, a rugged fit, or hooks on the insertion unit 51.

Embodiment 7

Figure 10:
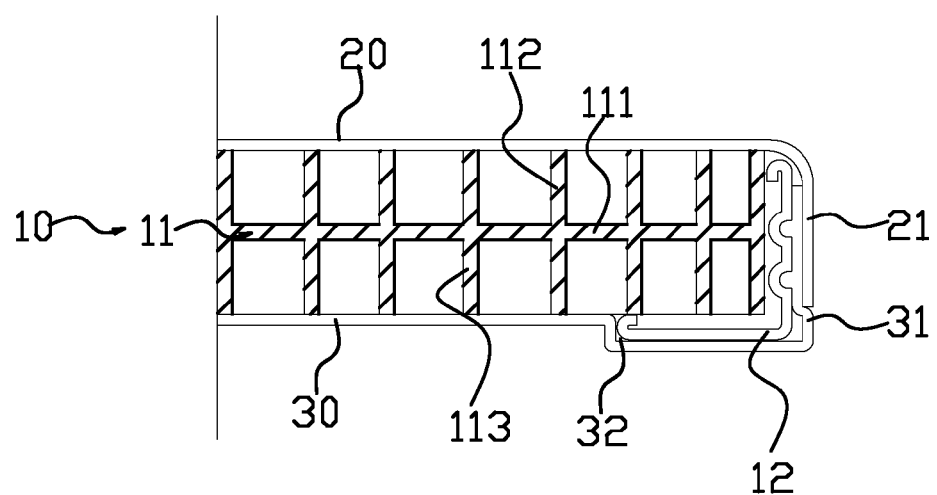
FIG. 10 is a sectional view of the composite plate of the Embodiment 7.
Figure 11:
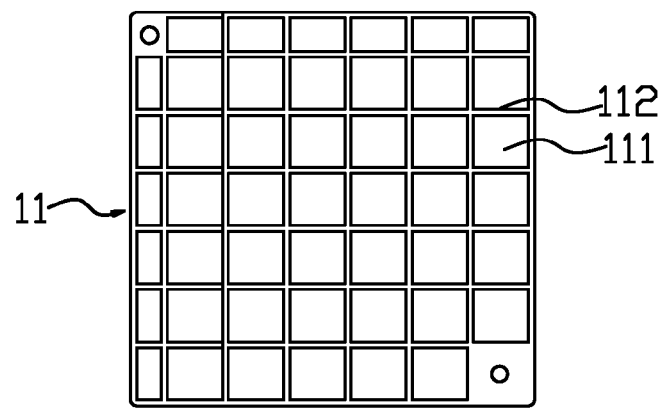
FIG. 11 is a bottom view of the support core of the Embodiment 7.
Figure 12:
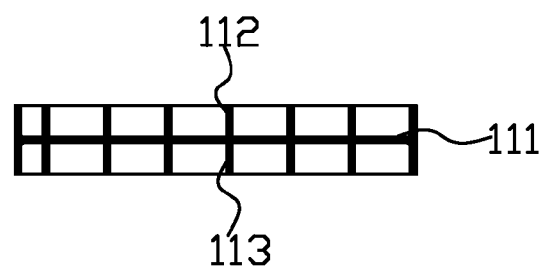
FIG. 12 is a sectional view of the support core of the Embodiment 7.

Referring to FIGS. 10-12, the difference between Embodiment 7 and Embodiment 3 is that the vertical edge of the support frame 12 is wave-shaped, a corresponding shape is provided on the inner surface of the lower outside periphery 31 to match the wave-shape. The honeycomb structure of the support core 11 comprises a middle plate 111 serving as a support plate, a plurality of quadrilateral honeycomb cells above the middle plate 111 surrounded by the walls 112, and a plurality of quadrilateral honeycomb cells below the middle plate 111 surrounded by the walls 113. The adjacent surrounding walls 112 are shared. In the honeycomb structure, the upper surrounding walls 112 of the quadrilateral cells extend from the middle plate 111 to form the upper honeycomb cells with upward openings. The lower surrounding walls 113 of the quadrilateral cells extend from the middle plate 111 to form the lower honeycomb cells with downward openings. Both the upper and the lower honeycomb cells are blind slots. The honeycomb structure can be made in a single step by mould pressing and foaming to form the desired shape without additional machining. Generally, this Embodiment can be used for a composite plate that has high strength requirement for the core plate. In order to increase the structural strength, prior art technology provides a multi-layer structure with double honeycomb paper cores by adding a dividing plate therebetween, thus the manufacture of the prior art honeycomb plate is complex, and the product has a lower strength. The present invention is therefore advantageous over the existing technology.

Embodiment 8

Figure 13:
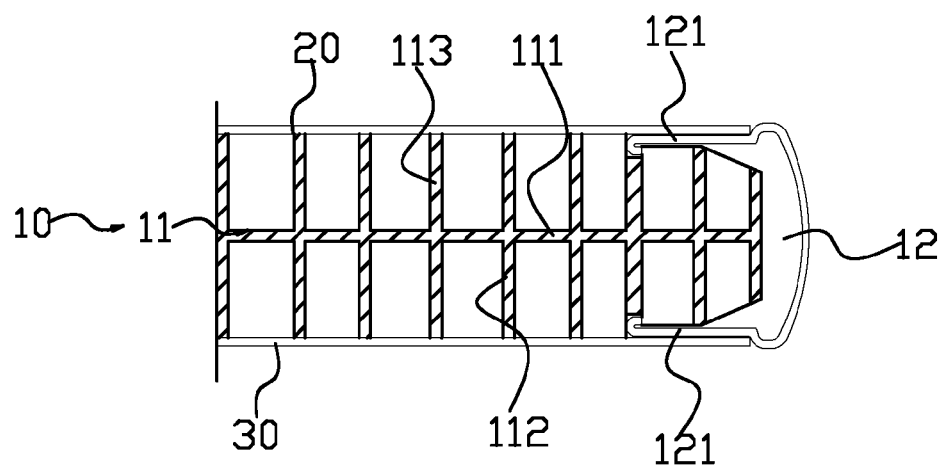
FIG. 13 is a sectional view of the composite plate of the Embodiment 8.

Referring to FIG. 13, the difference between Embodiment 8 and Embodiment 7 is that elastic claws 121 are set on the upper part and the lower part of the support frame 12 The upper elastic claw 121 of the support frame 12 inserts into the space between plastic surface sheet 20 and support core 11, and is fastened by an elastic claw. The lower elastic claw 121 of the support frame 12 inserts into the space between plastic base sheet 30 and support core 11, and is fastened by an elastic claw. The outer periphery of the support frame 12 forms the periphery of the composite plate.

Embodiment 9

Figure 14:
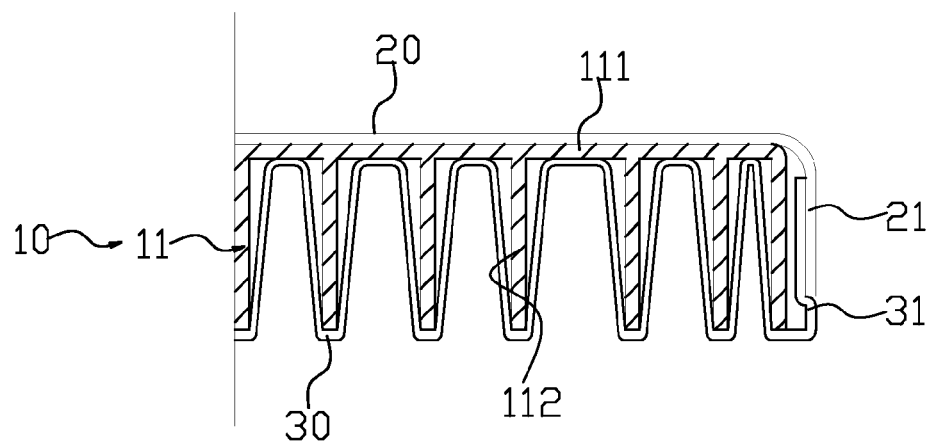
FIG. 14 is a sectional view of the composite plate of the Embodiment 9.

Referring to FIG. 14, the difference between Embodiment 9 and Embodiment 1 is that the plastic base sheet 30 is wave-shaped, the lowest part is welded or glued to the bottom of blind slot 112 of support core 11. The convex part of the plastic base sheet 30 extends into the honeycomb slots of the support core 11 and is welded or glued to the top of blind slot 112. The plastic plate 20 is welded or glued to the upper plate 111.

Embodiment 10

Figure 15:
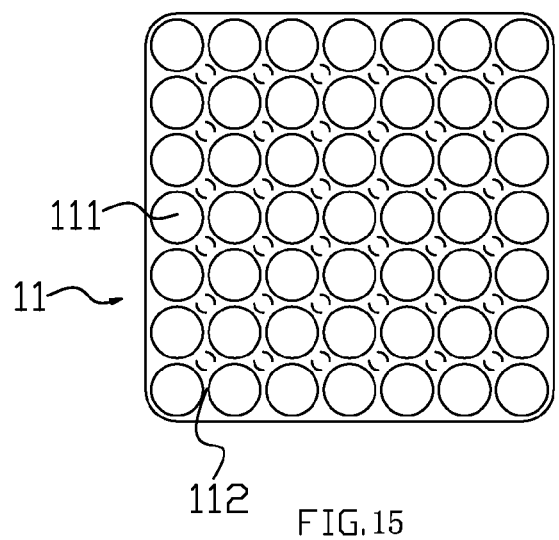
FIG. 15 is a top view of the support core of the Embodiment 10.
Figure 16:
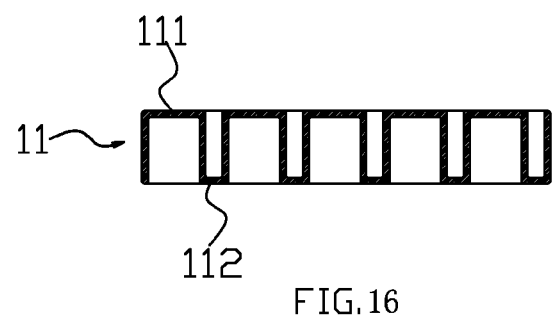
FIG. 16 is a sectional view of the support core of the Embodiment 10.

Referring to FIGS. 15-16, the difference between Embodiment 10 and Embodiment 1 is that the honeycomb structure comprises a plurality of circular blind honeycomb cells 111 opening downwards, a link plate 112 is provided between each of the two adjacent bottoms of the honeycomb slots 111. As the honeycomb slots 111 is closed at one end, and the link plate 112 is provided at the other end, the honeycomb can be made in a single step by mould pressing and foaming to form the desired shape.

Embodiment 11

Figure 17:
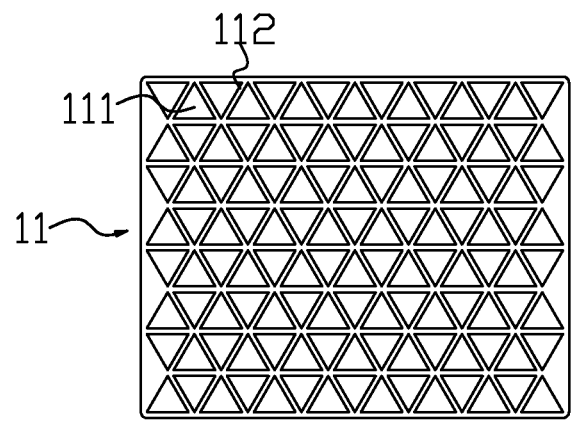
FIG. 17 is a bottom view of the support core of the Embodiment 11.
Figure 18:
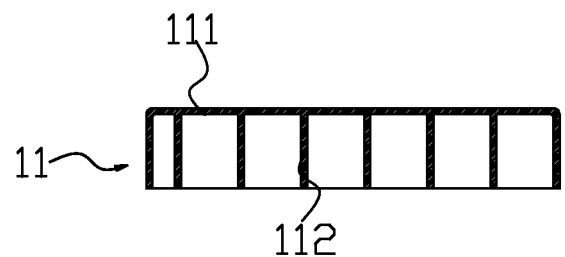
FIG. 18 is a sectional view of the support core of the Embodiment 11.

Referring to FIGS. 17-18, the difference between Embodiment 11 and Embodiment 1 is that the honeycomb structure comprises a plate 111 and a plurality of triangle cells surrounded by the walls 112 extending from the bottom of the upper plate 111. The adjacent surrounding walls 112 are shared. In the honeycomb structure, the surrounding walls 112 and the plate 111 form a plurality of honeycomb cells with downward openings. With the upper plate 111, the honeycomb structure can be made in a single step by mould pressing and foaming to form the desired shape.

Embodiment 12

Figure 19:
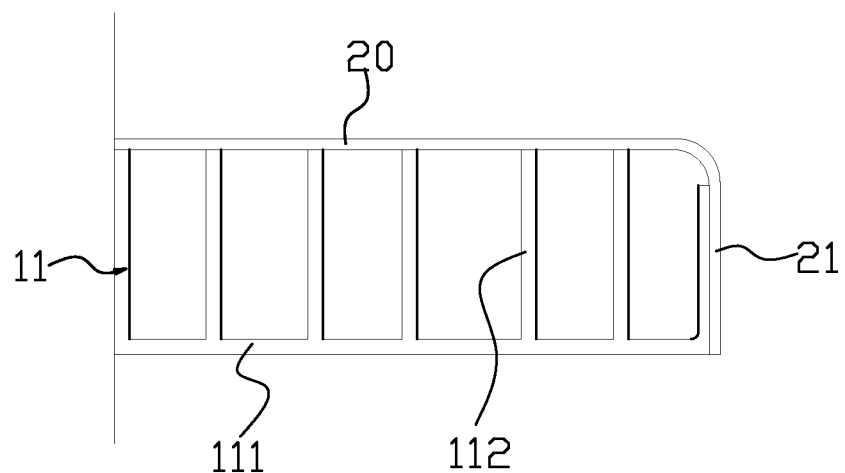
FIG. 19 is a sectional view of the composite plate of the Embodiment 12.

Referring to FIG. 19, the difference between Embodiment 12 and Embodiment 1 is that a plastic foam honeycomb composite plate comprises a support body 10 and a plastic surface sheet 20.

The support body 10 comprises a support core 11, the support core 11 is a honeycomb structure made by a plastic foam material, and the support core 11 in the embodiment has a flat-plate shape. Referring to FIGS. 2 and 3, the honeycomb structure is a bionics product made according to the structural feature of a beehive. In the embodiment, the honeycomb structure comprises a lower plate 111, and the surrounding walls 112 of the hexagonal cells extending from the top of the lower plate 111 to form a structure. The adjacent walls 112 of the hexagonal cells are shared. In the honeycomb structure, the walls 112 of the hexagonal cells extend from the lower plate 111 to form the honeycomb cells, the honeycomb cells are blind slots and open upwards. Together with the lower plate, the honeycomb structure can be made in a single step by mould pressing and foaming to form the desired shape without additional machining. The provision of the lower plate 111 also saves an extra plastic base sheet.

The plastic surface sheet 20 and the plastic base sheet 30 have similar structure, both being a single layer plastic sheet with a thickness between 0.3 mm-4 mm. The single layer plastic using ABS, PP or PS is produced using vacuum molding or processed directly to desired shapes. The single layer plastic sheet is then cut to a desired size according as a surface sheet, for example, square, rectangular, circular, other regular or irregular shapes. In the embodiment, the vacuum formed surface sheet 20 and the vacuum formed bottom surface sheet 30 are all rectangle plate. Both sheets have wood grains, other grains, or composite layer with wood grains and other grains printed thereon. In the embodiment, the vacuum formed surface sheet 20, the vacuum formed base sheet 30 are exemplary single layer plastic, but multilayer plastics plate can be used in the present invention as well. The edge of the plastic surface sheet 20 extends downwards to form upper outside periphery 21.

The underside of the plastic surface sheet 20 is sealed and fastened to the top of the support core 11 by ultrasonic welding or gluing. The inner surface of the upper outside periphery 21 is sealed and fastened to the outer surface of the support core 11 by ultrasonic welding or gluing. The plastic surface sheet 20 and the support core 11 are fastened together by ultrasonic welding or gluing,

Embodiment 13

Figure 20:
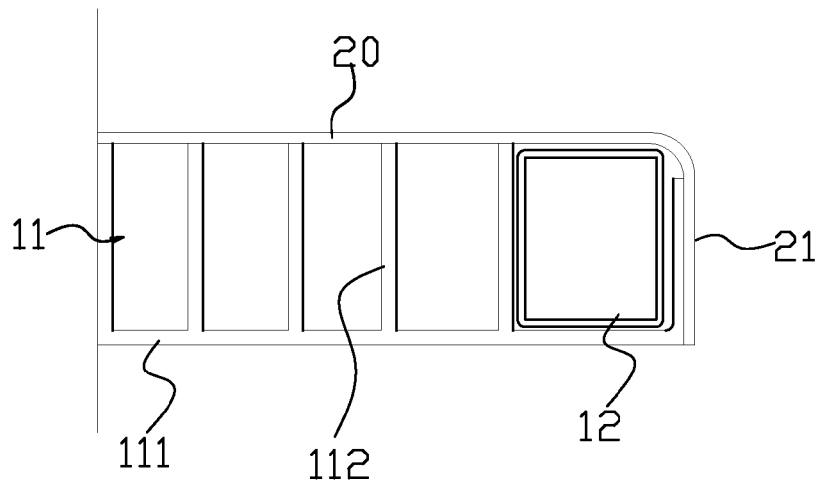
FIG. 20 is a sectional view of the composite plate of the Embodiment 13.

Referring to FIG. 20, the difference between Embodiment 12 and Embodiment 13 is that the support body 10 comprises a support frame 12, the support frame 12 is used to enhance bearing strength and to connect to other components. The whole support frame 12 is a closed-loop frame, for example but not limited to "▢" shaped frame or "O" shaped frame, other shaped frame can be used in the present invention as well. For example: four pipes may be arranged to form a "▢" shaped frame; a "I" shaped frame; a "II" shaped frame. The sectional view of the support frame 12 in the Embodiment is a hollow pipe. However, other non-limiting examples include extrusion material, or a combination of pipe, extrusion material and hardware and injection molding components can all be used in the present invention.

A slot is set on the periphery of the support core 11, the support frame 12 is firmly fastened in the slot of the support core 11. The plastic surface sheet 20 is welded or glued to the top of the support core 11 and the top of the support frame 12.

Embodiment 14

Figure 21:
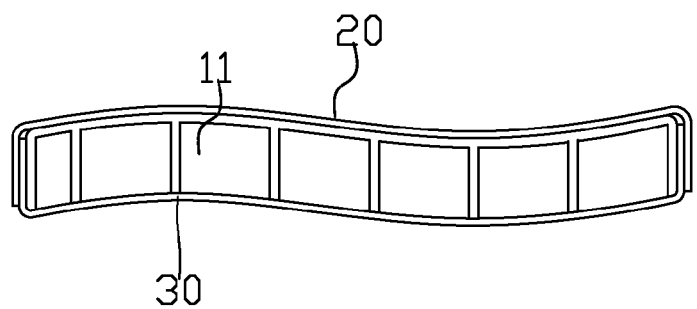
FIG. 21 is a sectional view of the composite plate of the Embodiment 14.
Figure 22:
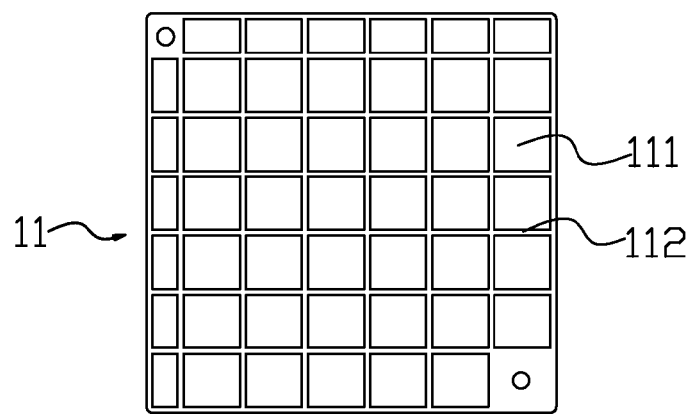
FIG. 22 is a bottom view of the support core of the Embodiment 14.
Figure 23:
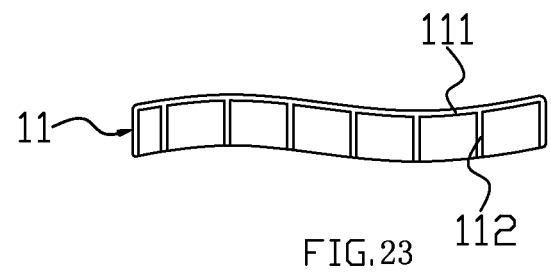
FIG. 23 is a sectional view of the support core of the Embodiment 14.

Referring to FIGS. 21-23, the difference between Embodiment 14 and Embodiment 12 is that the support core 11 in the Embodiment is a curved plate. After setting the upper mould and the lower mould, the mold cavity provided between them is a curved plate. The curved plate can be made in a single step by mould pressing and foaming to form the desired shape. The honeycomb structure of the support core 11 comprises the upper plate 111 and a plurality of quadrilateral surrounding walls extending from the bottom of the upper plate 111.

Embodiment 15

Figure 24:
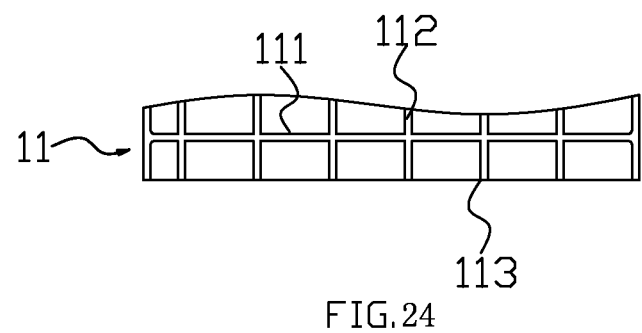
FIG. 24 is a sectional view of the support core of the Embodiment 15.

Referring to FIG. 24, the difference between Embodiment 15 and Embodiment 7 is that the honeycomb structure of the support core 11 comprises a middle plate 111 serving as a support plate, a plurality of quadrilateral honeycomb cells above the middle plate 111 surrounded by the walls 112 and a plurality of quadrilateral honeycomb cells below the middle plate 111 surrounded by the walls 113. The upper quadrilateral surrounding walls form a curved shape, and the lower quadrilateral surrounding walls form a flat surface.

Embodiment 16

Figure 25:
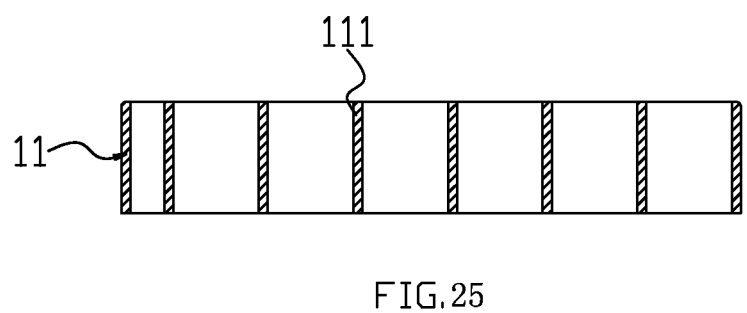
FIG. 25 is a sectional view of the support core of the Embodiment 16.

Referring to FIG. 25, the difference between Embodiment 15 and Embodiments 1, 11, 14 and 15 is that the honeycomb structure of the Embodiment comprises surrounding walls 111 of the hexagonal cells, and the adjacent hexagonal surrounding walls 111 are shared, the surrounding walls 111 of the hexagonal cells form through slots. Because adjacent surrounding walls 112 of the regular hexagonal are shared, the honeycomb structure can be made in a single step by mould pressing and foaming to form the desired shape without additional machining.

The present invention has been described with regard to one or more embodiments. However, it will be apparent to persons skilled in the art that a number of variations and modifications can be made without departing from the scope of the invention as defined in the claims.

INDUSTRIAL APPLICABILITY

The present invention is a honeycomb composite plate comprising a plastic foam honeycomb core. The support core of the honeycomb structure is made by the plastic foam material, thus the plate has high bearing strength, low cost and can be shaped by a single step to form regular or irregular shaped support core directly.

What is claimed is:
1. A composite plate comprising:
a plastic foam support core having a honeycomb structure with honeycomb cells, the plastic foam support core comprising a support plate and walls extending from the support plate defining the honeycomb cells, the support plate and the walls of the honeycomb cells being made by a single step mould pressing and foaming to form a single-piece, unitary structure;

a plastic surface sheet covering an upper side of the plastic foam support core, the plastic surface sheet fastened to the plastic foam support core; and a plastic base sheet supporting a lower side of the plastic foam support core, wherein the honeycomb cells of the support core are blind slots, the plastic surface sheet extends downwards at an edge of the plastic foam support core, the plastic base sheet extends upwards at the edge of the plastic foam support core, and the plastic surface sheet and the plastic base sheet overlap to form an edge of the composite plate.

2. The composite plate according to claim 1, further comprising a support frame.

3. The composite plate according to claim 2, wherein the support frame surrounds all or part of a periphery of the plastic foam support core.

4. The composite plate according to claim 1, wherein the plastic surface sheet is a vacuum molding surface sheet, and the plastic substrate is a vacuum molding substrate.

5. The composite plate according to claim 1, wherein the plastic surface sheet and the plastic base sheet are welded or glued to the plastic foam support core.

6. The composite plate according to claim 1, wherein the honeycomb cells have upward or downward openings.

7. The composite plate according to claim 6, wherein the support plate is an upper plate.

8. The composite plate according to claim 6, wherein the support plate is a lower plate.

9. The composite plate according to claim 6, wherein the honeycomb cells of the support core are double-faced slots, and the support plate is a middle plate.

10. The composite plate according to claim 7, wherein said plastic base sheet is wave-shaped, and extends into the blind slots of the honeycomb cells of the support core, and is welded or glued to a top of the blind slots.

11. The composite plate according to claim 6, wherein the plastic foam support core has a curved shape.

* * * * *